US012769751B2

(12) United States Patent
Kelco et al.

(10) Patent No.: US 12,769,751 B2
(45) Date of Patent: Oct. 20, 2026

(54) CROSS LAYER GLOBAL DATABASE PROFILING SYSTEM

(71) Applicant: Snowflake Inc., Bozeman, MT (US)

(72) Inventors: Samuel Graham Kelco, San Jose, CA (US); Min Qiu, Los Altos, CA (US); Xiang Xiao, Los Altos, CA (US); Khaled Yagoub, Fremont, CA (US); Jiaqi Yan, Menlo Park, CA (US); Yan Wang, Dublin, CA (US); Stephen Mark Andrew Clark, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/960,678

(22) Filed: Nov. 26, 2024

(65) Prior Publication Data

US 2026/0147777 A1 May 28, 2026

(51) Int. Cl.
*G06F 16/248* (2019.01)
*G06F 16/2455* (2019.01)

(52) U.S. Cl.
CPC ...... *G06F 16/248* (2019.01); *G06F 16/24556* (2019.01)

(58) Field of Classification Search
None
See application file for complete search history.

(56) References Cited

U.S. PATENT DOCUMENTS

| | | | | |
|---|---|---|---|---|
| 10,019,340 | B2 * | 7/2018 | Nicol | G06F 11/34 |
| 2007/0043531 | A1 * | 2/2007 | Kosche | G06F 11/3476 702/182 |
| 2022/0214356 | A1 * | 7/2022 | Henikoff | C12Q 1/6804 |
| 2023/0089783 | A1 * | 3/2023 | Patel | G06F 11/1433 707/703 |
| 2023/0129763 | A1 * | 4/2023 | Kovachev | G06F 16/24522 707/722 |

* cited by examiner

*Primary Examiner* — Yu Zhao
(74) *Attorney, Agent, or Firm* — Schwegman Lundberg & Woessner, P.A.

(57) ABSTRACT

Methods and systems for generating a global database profile are described. The methods and systems receive, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers. The methods and systems aggregate the profiling data received from the plurality of layers into global database profiling data associated with the plurality of layers of the database system and present visual output based on the profiling data, the visual output representing the database logic operations and the physical states at each of the plurality of layers over time.

31 Claims, 7 Drawing Sheets

CROSS LAYER GLOBAL DATABASE PROFILING SYSTEM

TECHNICAL FIELD

Examples of the disclosure relate generally to data platforms and databases and, more specifically, to profiling operations performed by a database system.

BACKGROUND

Databases are widely used for data storage and access in computing applications. A goal of database is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The various operations that can be performed on the databases are controlled based on access privileges of requesting entities.

BRIEF DESCRIPTION OF THE SEVERAL VIEWS OF THE DRAWINGS

Various ones of the appended drawings merely illustrate various examples of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

DETAILED DESCRIPTION

Figure 1:
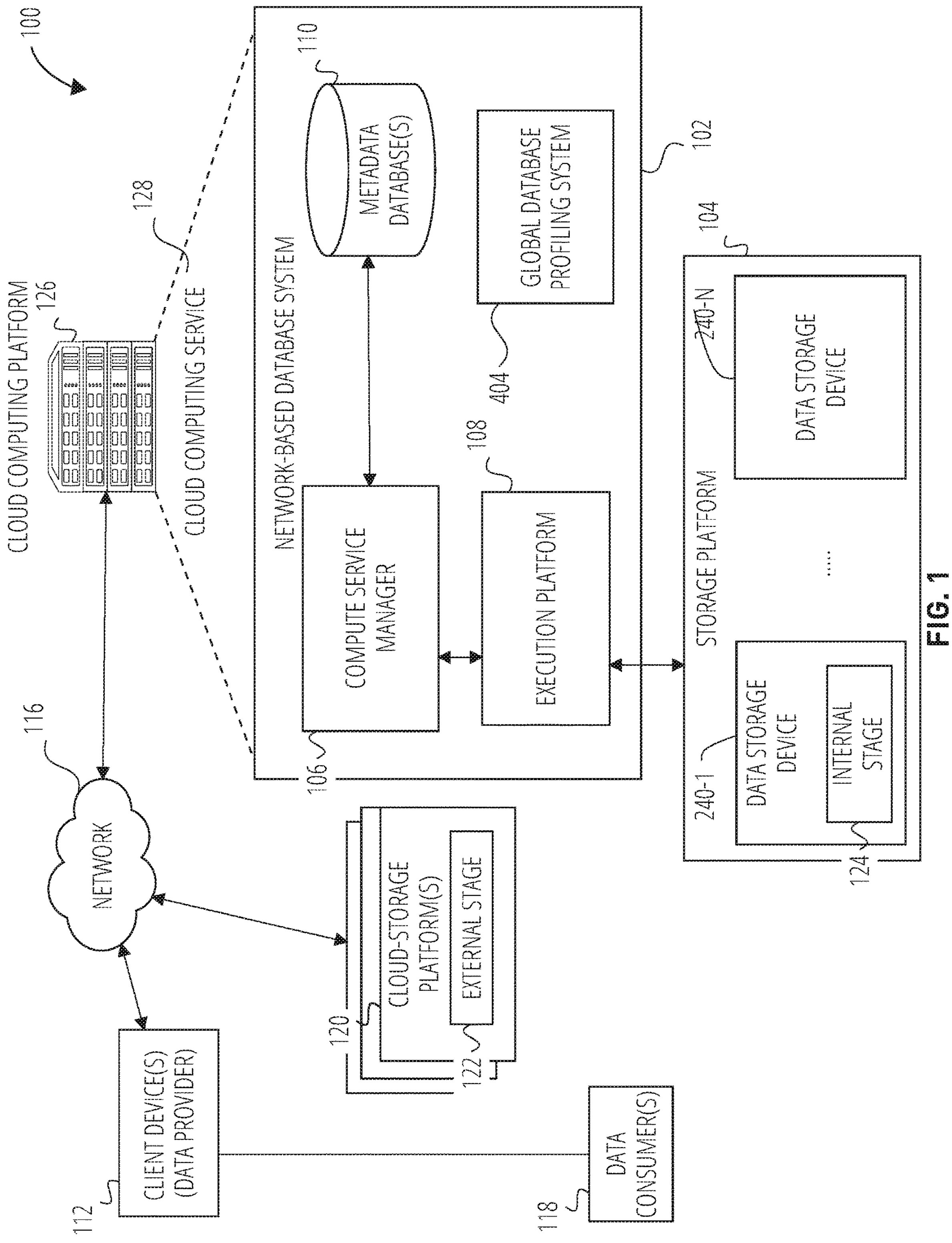
FIG. 1 illustrates an example computing environment that includes a network-based data platform, in accordance with some examples.

Reference will now be made in detail to specific examples for carrying out the inventive subject matter. Examples of these specific examples are illustrated in the accompanying drawings, and specific details are outlined in the following description to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The database can include one or more objects, such as tables, functions, and so forth.

Users and/or executing processes that are associated with a given customer account may, via one or more types of clients, be able to cause data to be ingested into the database, and may also be able to manipulate the data, add additional data, remove data, run queries against the data, generate views of the data, and so forth. In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, partitions, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

Traditional database systems have long struggled with providing comprehensive and efficient performance analysis across multiple layers and components. Conventional approaches focus on collecting and surfacing information at the level of individual queries, which proves inadequate for modern high-performance database workloads. These systems typically rely on measurements, such as span measurements for query states and compilation stages, as well as aggregated execution stats and internal metrics at the level of individual compute node instances. While useful for basic diagnostics, these methods fall short when dealing with high-QPS (Queries Per Second) workloads, where understanding performance bottlenecks at the workload level is important.

Existing systems lack the capability to provide a unified view of performance across different layers of the distributed database architecture. This siloed approach makes it challenging to identify and diagnose issues that span multiple components or layers. Furthermore, the reliance on query-level information and system-level metrics prove insufficient for enabling detailed drill-down analysis, particularly for complex workloads. Another significant limitation of conventional approaches is the cost and overhead associated with comprehensive data collection. Methods such as instrumentation, logging, and exact stats aggregation become prohibitively expensive to maintain by default at finer levels of granularity. This leads to gaps in observability, such as for high-concurrency workloads where understanding the distribution of resources and time across various system components is an important factor. Due to the siloed nature of conventional systems, such systems also struggle with providing a balance between real-time and historical analysis capabilities. They lack the flexibility to analyze current performance issues while also allowing for in-depth investigation of past events. This limitation hampers the ability of database administrators and performance engineers to conduct both proactive monitoring and reactive troubleshooting effectively. This makes it difficult to gain a holistic understanding of database performance and identify complex interactions between different components and workloads. The inefficiencies of prior approaches and the inability of existing systems to analyze activity of database operations at different levels collectively creates a significant gap in database performance analysis and optimization.

Traditional database systems often rely on collecting and storing vast amounts of low-level data, such as detailed logs and exact statistics for every query, which consume substantial storage and processing resources. This approach is particularly wasteful for high-concurrency workloads, where the sheer volume of data collected often outweighs its practical utility. Furthermore, the processing and analysis of this extensive data require significant computational resources, leading to increased operational costs without proportional gains in performance insights. The siloed nature of performance data collection across different database layers results in redundant data collection and storage, as similar information may be captured multiple times across various components. This redundancy not only wastes storage resources but also complicates data analysis efforts, requiring additional processing to reconcile and correlate information from different sources. Moreover, the lack of a unified profiling approach means that database administrators and performance engineers have to switch between multiple tools and navigate between different user interfaces to gain a comprehensive understanding of system performance, leading to inefficient use of human resources and increased potential for overlooking critical performance issues.

Aspects of the present disclosure include systems, methods, and devices to address, among other problems, the aforementioned shortcomings of conventional data platforms by intelligently generating a global database profile. The disclosed techniques receive, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers. The disclosed techniques aggregate the profiling data received from the plurality of layers into global database profiling data associated with the plurality of layers of the database system and present visual output based on the profiling data, the visual output representing the database logic operations and the physical states at each of the plurality of layers over time. This saves a great deal of time and effort and prevents propagation of errors, which improves the overall efficiency of the system.

Specifically, the disclosed database profiling system significantly improves the efficiency of analyzing database system performance by implementing a unified, comprehensive approach to data collection and analysis across multiple system layers. For example, by collecting profiling information across the compute service manager, execution platform, and metadata databases layers, the disclosed techniques provide a holistic view of system performance without the need for manual configuration or activation. This approach eliminates the inefficiencies associated with siloed data collection and analysis, thereby reducing redundancy and resource waste. The use of a standardized global profiler data format can enable the unification of both database system activity (e.g., logic operations of the database system) and system activity (e.g., physical states) profiling data, allowing for more efficient data processing and analysis. The post-processing pipeline of the disclosed techniques further enhances efficiency by merging data from the different layers and activity types to provide a consolidated view of system performance. This unified approach enables more effective drill-down analysis across multiple observability levels, allowing database administrators and performance engineers to quickly identify and address performance bottlenecks without switching between multiple tools or interfaces. Additionally, the support for both real-time and historical analysis, coupled with its multidimensional analysis capabilities, allows for more efficient proactive monitoring and reactive troubleshooting, ultimately leading to improved overall database system performance and resource utilization.

FIG. 1 illustrates an example computing environment 100 comprising a database system in the example form of a network-based database system 102 that includes a global database profiling system 404, according to some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other examples, the computing environment may comprise another type of network-based database system or a cloud data platform. For example, in some examples, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., server query language (SQL) queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device 112 (or devices) operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some examples, metadata database 110 is configured to store account object metadata (e.g., account objects used in connection with a replication group object).

Figure 3:
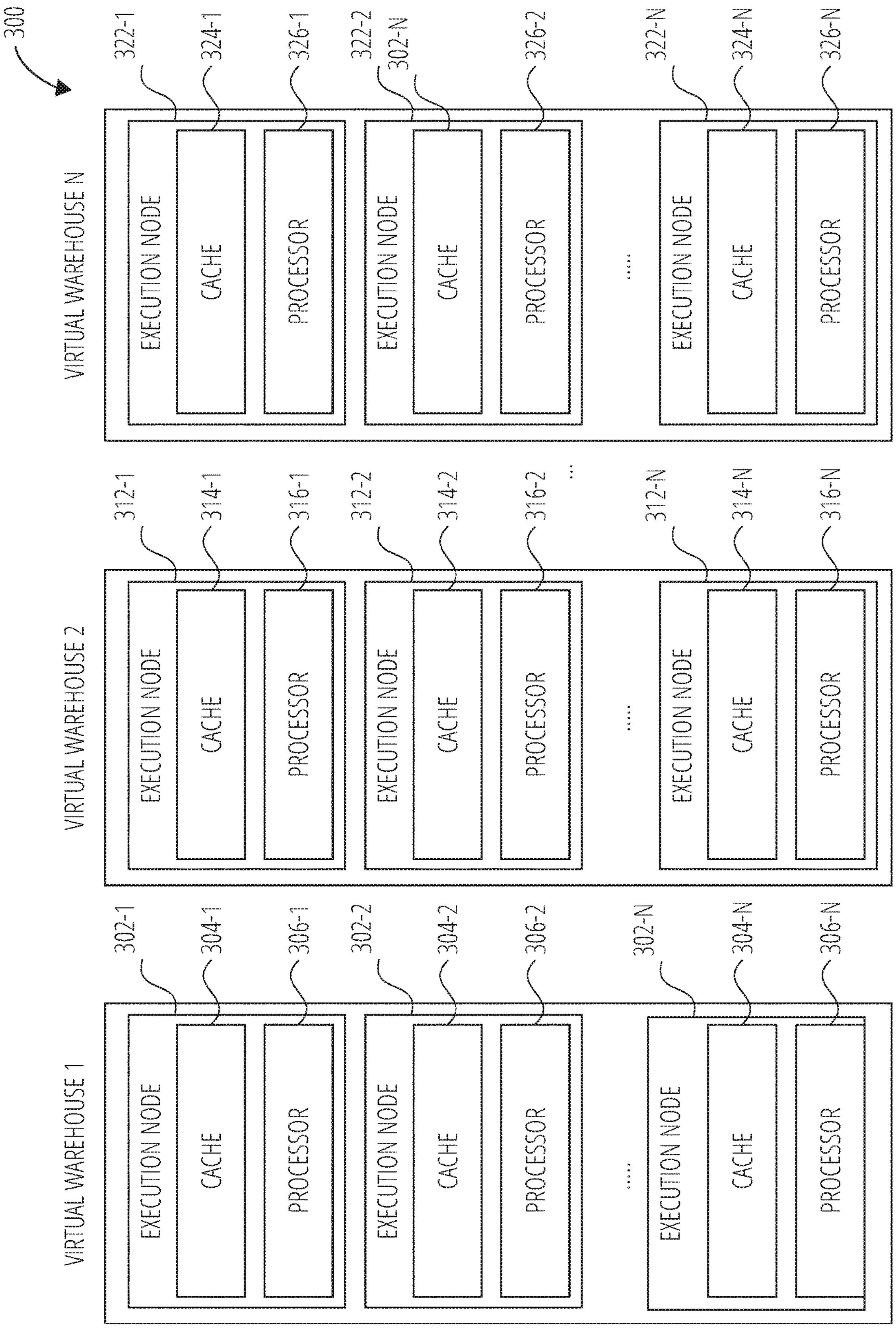
FIG. 3 is a block diagram illustrating components of an execution platform, in accordance with some examples.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 240-1 to 240-N. In some examples, the data storage devices 240-1 to 240-N are cloud-based storage devices located in one or more geographic locations. For example, the data storage devices 240-1 to 240-N may be part of a public cloud infrastructure or a private cloud infrastructure. The data storage devices 240-1 to 240-N may be hard disk drives (HDDs), solid-state drives (SSDs), storage clusters, Amazon S3 ™ storage systems, or any other data-storage technology. Additionally, the cloud storage platform 104 may include distributed file systems (such as Hadoop Distributed File Systems (HDFS)), object storage systems, and the like. In some examples, at least one internal stage 124 may reside on one or more of the data storage devices 240-1 through 240-N, and at least one external stage 122 may reside on one or more of the cloud-storage platforms 120.

In some examples, communication links between elements of the computing environment 400 are implemented via one or more data communication networks. These data communication networks may utilize any communication protocol and any type of communication medium. In some examples, the data communication networks are a combination of two or more data communication networks (or sub-networks) coupled to one another. In alternative examples, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described examples, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 240-1 to 240-N in the storage platform 104. Thus, the computing resources and cache resources are not restricted to specific data storage devices 240-1 to 240-N. Instead, all computing resources and all cache resources may retrieve data from, and store data to, any of the data storage resources in the storage platform 104.

As also shown, the network-based database system 102 comprises global database profiling system 404. The global database profiling system 404 can be part of one of the layers of the network-based database system 102 or can be a standalone component. The global database profiling system 404 can generate a global database profile. The global database profiling system 404 receives, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers. The global database profiling system 404 aggregates the profiling data received from the plurality of layers into global database profiling data associated with the plurality of layers of the database system and presents visual output based on the profiling data, the visual output representing the database logic operations and the physical states at each of the plurality of layers over time.

Figure 2:
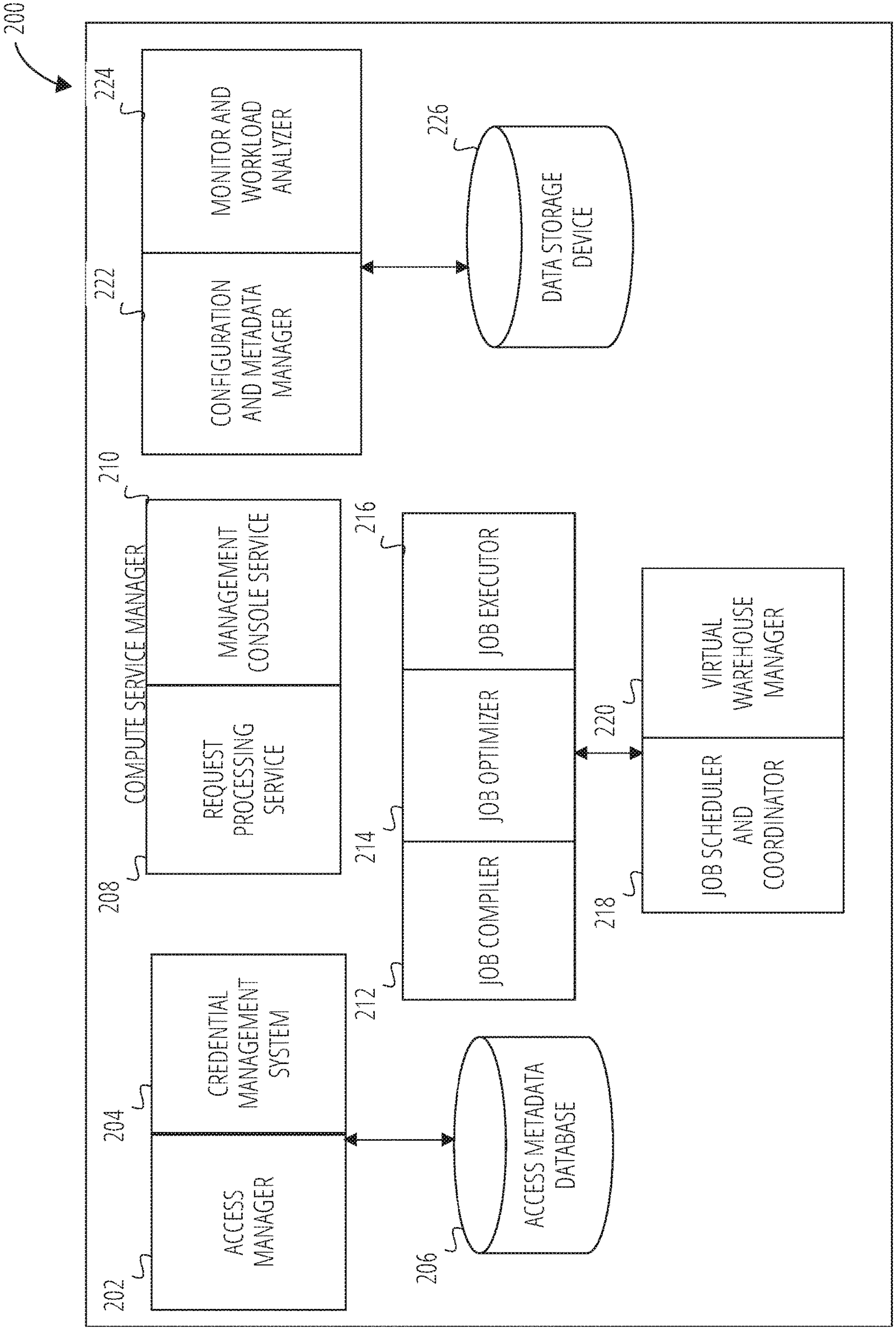
FIG. 2 is a block diagram illustrating components of a compute service manager, in accordance with some examples.

FIG. 2 is a block diagram 200 illustrating components of the compute service manager 206, according to some examples of the present disclosure. As shown in FIG. 2, the compute service manager 106 includes an access manager 202 and a credential management system 204 coupled to access metadata database 206, which is an example of the metadata database(s) 110.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service execution platform 108 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an example, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some examples, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in examples herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram 300 illustrating components of the execution platform 108, according to some examples of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 240-1 to 240-N shown in FIG. 1. Thus, the virtual warehouses are not necessarily assigned to a specific data storage device 240-1 to 240-N and, instead, can access data from any of the data storage devices 240-1 to 240-N within the storage platform 104. Similarly, each of the execution nodes shown in FIG. 3 can access data from any of the data storage devices 240-1 to 240-N. In some examples, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-N and a processor 326-2. Execution node 322-N includes a cache 324-N and a processor 326-N. As referred to herein, the compute service manager 106, metadata databases 110, and execution platform 108 form different layers of the network-based database system 102. While only three layers are shown and described, similar techniques can be applied to any number of additional or fewer layers.

In some examples, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some examples, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
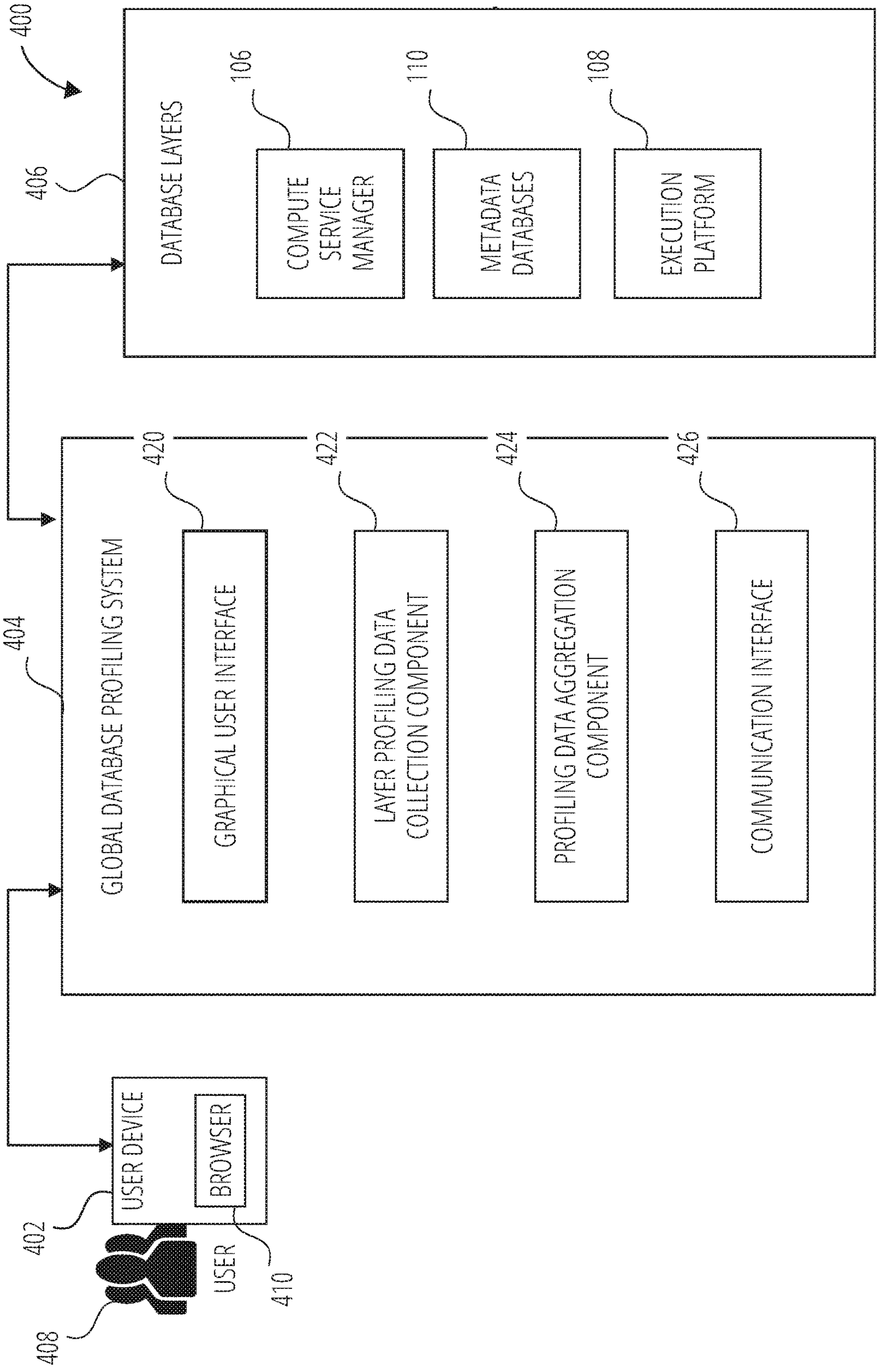
FIG. 4 is a block diagram of a global database profiling system, in accordance with some examples.

FIG. 4 is an example block diagram of a computing environment 400 of a high-level system architecture illustrating an example of a global database profiling system 404 embodying circuits, controllers, computing devices, data stores, communication infrastructure (e.g., network connections, protocols, etc.), or the like that implement operations described herein, according to some examples of the present disclosure. One or more components of the global database profiling system 404 can be implemented using machine 700 as described herein with respect to FIG. 7.

As utilized herein, circuits, controllers, computing devices, components, modules, or other similar aspects set forth herein should be understood broadly. Such terminology is utilized to highlight that the related hardware devices can be configured in a number of arrangements, and include any hardware configured to perform the operations herein. Any such devices can be a single device, a distributed device, and/or implemented as any hardware configuration to perform the described operations. In certain examples, hardware devices can include computing devices of any type, logic circuits, input/output devices, processors, sensors, actuators, web-based servers, LAN servers, WLAN servers, cloud computing devices, memory storage of any type, and/or aspects embodied as instructions stored on a computer-readable medium and configured to cause a processor to perform recited operations. Communication between devices, whether inter communication (e.g., a user device 402 communicating with global database profiling system 404) or intra-device communication (e.g., one circuit or component of the global database profiling system 404 communicating with another circuit or component of the global database profiling system 404) can be performed in any manner, for example using internet-based communication, LAN/WLAN communication, direct networking communication, Wi-Fi communication, or the like.

According to various examples, the global database profiling system 404 is configured to generate both programmatic and visual output using profiling data collected from a plurality of database layers 406. While the disclosed examples relate to presenting the visual output of the profiling data, the profiling data may be analyzed programmatically using various programmatic interfaces enabling direct data exploration including filtering, aggregation, and/or drill down analysis. As shown, the global database profiling system 404 comprises a graphical user interface 420, layer profiling data collection component 422, profiling data aggregation component 424, and a communication interface 426. A user 408 at the user device 402 can access the global database profiling system 404 and use the global database profiling system 404 to generate or access visual output representing database operations at various layers of the database layers 406. For example, the user 408 can use a browser 410 on the user device 402 to access the global database profiling system 404 and as part of the access, the graphical user interface 420 of the global database profiling system 404 can cause presentation of one or more graphical user interfaces on the user device 402 (e.g., on the browser 410). The user 408 can login into the global database profiling system 404. The graphical user interface 420 can include the visual output 501 shown in FIG. 5.

In some examples, the global database profiling system 404 (e.g., the layer profiling data collection component 422) communicates with each layer of the database layers 406 separately or concurrently to obtain profiling data generated by that respective layer, or consumes data produced by each layer through dedicated ingestion pipelines. The system can make sure that the same relevant context is made available to all layers (e.g., passed from the originating layer of the context to the destination layer) to enable production of required data dimensions. Using the profiling data that is separately obtained, the global database profiling system 404 (e.g., the profiling data aggregation component 424) can generate a global profile or global profiling data for multiple queries and/or operations that are performed by the database layers 406.

For example, each layer in the database layers 406 can periodically collect and/or generate a plurality of samples representing database operations performed by that layer including operations performed by logical components of the network-based database system 102 and/or physical components performed by the underlying operating system of each layer. The samples that are collected can be stored in a unified data structure according to a unified global profiling schema that is defined by the global database profiling system 404. The global database profiling system ensures that each layer has the relevant context information to produce profiling data that is conformant to the unified schema. The unified global profiling schema can include multiple dimensions. For example, the unified global profiling schema can include specifications for representing profiling data in a unified and consistent manner across the database layers 406.

In some examples, the data format can be a logical requirement of the samples, and each layer and component can choose to implement the sampling collection differently as long as the relevant information is properly captured. For example, it is not a requirement for each sample data point to contain all the dimensions when it is produced at the source, as long as there is a way to associate the relevant information back to each data point later on during post processing.

The unified global profiling scheme (or schema) (also called the global profiler data format) can consist of the following dimensions: global observability levels, layer specific observability levels, timestamps, activity states, wait states, and/or additional flags. The global observability levels enable unification across components and fine-grained drill down analysis. The global observability levels can include query lineage levels, such as account, warehouse, user, session information, recurrent query identifiers which can be generated by using parametrized query hash information to enable aggregation across multiple executions of the same recurrent query, and one or more tags. The global observability levels can include object lineage levels, which can specify a specific database identifier, schema identifier, table identifier, and/or index identifier information. The query lineage dimensions can include any one or more of the following: account information representing the account the profiler activity belongs to; warehouse information representing the warehouse the profiler activity belongs to; user information representing the user the profiler activity is performed on behalf of; session information representing the session the profiler activity is running on; recurrent query information representing the recurrent query that the profiler activity belongs to; query information including the individual query/job that the profiler activity belongs to; query plan information representing the hash for the query plan; root query information representing the root of a group of child queries, which can be useful for analyzing stored procedures and recursive queries; query tags with a tag specified by users at the query lineage that can be used to group multiple queries together; and transaction information including a transaction the query belongs to.

Object Lineage Dimensions can include the database information representing the database the profiler activity acts on; schema information representing the schema the profiler activity acts on; object information representing the object the profiler activity acts on and can be represented as a type of the object, such as Hybrid/Dynamic Tables, Hybrid Index, Materialized Views, and so forth; and object tag information that represents tags specified by users at the object lineage that can be used to group multiple objects together.

Object Lineage Dimensions can include the database information representing the database the profiler activity acts on; schema information representing the schema the profiler activity acts on; object information representing the object the profiler activity acts on and can be represented as a type of the object, such as Hybrid Tables, Materialized/Dynamic Tables, Hybrid Index, Materialized Views, and so forth; and object tag information that represents tags specified by users at the object lineage that can be used to group multiple objects together.

The layer specific observability levels can include instance lineage levels, such as instance and cluster information. The layer specific observability levels can also include system component information. The timestamp information included in the unified global profiling scheme represents the time at which a particular sample of data was generated/collected by that particular layer. Each layer can generate the samples using information about a current thread being executed. The information can specify whether the thread is currently active, is in a wait state where the thread is waiting for a job to be completed or is in a wait state where the thread is idle and waiting to be executed. When the thread is in the wait state and pending execution, the thread is not actively doing work on the CPU but is in a state of waiting. In some cases, the thread is waiting for a job to be assigned, in which case the thread is idle waiting. In other cases, the thread is waiting for work to be completed on its behalf by other threads, components, and/or layers, in which case the thread is waiting on completion.

Active states can be used for cross-layer profiling since these can be summed up across layers to help understand CPU-Time distribution globally, whereas wait states are useful for analyzing inefficiencies within each layer. When analyzing wait states in each layer, it can be important to distinguish between the completely idle wait states and those that are waiting on other activities in the system, and they need to be categorized during instrumentation. When summarizing overall time spent in the system, idle wait states can be ignored; on the other hand, including wait states that reflect active work elsewhere in the system provides a more complete picture of time distribution that enables further drill down analysis. For example, including the States of waiting on execution platform 108 layer would enable better understanding of how much time is spent in the compute service manager 106 vs execution platform 108 layers, and help answer how much measured idleness is due to issues within the layer itself vs waiting on responses from other layers.

It may not be possible to associate every sample data point with all observability levels. For example, a profile sample for a join query that spans multiple databases may not have a corresponding database/schema level. Similarly, it may not be possible to associate a sample that corresponds to background activities with any query identifiers, users, or sessions. Nevertheless, when collected at the same frequency, such samples can still be analyzed together with those that do have corresponding observability levels to provide insights into the overall distribution of time spent.

As an example, the compute service manager 106 can generate a first set of profiling data periodically (with the same or similar periodicity or sampling frequency as other layers). The first set of profiling data can include sets of database logic operations and physical states of database threads executed by the compute service manager 106 layer and can be formatted and stored according to the unified global profiling schema. Similarly, the metadata databases 110 can generate a second set of profiling data periodically (with the same or similar periodicity or sampling frequency as other layers). The second set of profiling data can include sets of database logic operations and physical states of database threads executed by the metadata databases 110 layer and can be formatted and stored according to the unified global profiling schema. The execution platform 108 can generate a third set of profiling data periodically (with the same or similar periodicity or sampling frequency as other layers). The third set of profiling data can include sets of database logic operations and physical states of database threads executed by the execution platform 108 layer and can be formatted and stored according to the unified global profiling schema.

Each of the database layers 406 can be controlled by the layer profiling data collection component 422 to generate the respective set of samples. Namely, the layer profiling data collection component 422 can provide instructions to each of the layers as to the sampling frequency and the schema to use when generating the respective sets of samples. After a certain number of samples are collected, periodically and/or in real time, the layer profiling data collection component 422 can receive the samples (e.g., the first, second, and third sets of profiling data) from each of the compute service manager 106 layer, metadata databases 110 layer, and the execution platform 108 layer. The layer profiling data collection component 422 can then provide the collected samples to the profiling data aggregation component 424.

The profiling data aggregation component 424 aligns the samples received from the layer profiling data collection component 422. In some cases, the profiling data aggregation component 424 aligns the samples by matching timestamps and/or thread identifiers (or other unique identifiers) across the various samples of profiling data. This way, the profiling data aggregation component 424 can match different logical and physical operations performed at different layers of the network-based database system 102 in a way that provides cohesive understanding of the overall operations performed for each thread or process or task or query. In some cases, the profiling data aggregation component 424 removes duplicate entries across the samples.

When merging samples from multiple layers, the profiling data aggregation component 424 ensures that the samples are of the proper cardinality so that they can be summed together directly. This poses the following requirements on the profiling infrastructures in each layer. The profiling data aggregation component 424 instructs the layers to generate and collect samples at the same frequency. Sampling from different frequencies skews the number of data points available at each layer, and would need to be further normalized. The profiling data aggregation component 424 uses instrumentations to identify idle threads properly. Some wait states are still worth collecting but they should not be summed up directly if the system is already CPU-bound. On the other hand, there are threads that should not be profiled at all, including those in thread-pools waiting for work. While the same sampling frequencies are used for the convenience of implementation, the architecture is not limited to this restriction, and can handle uneven sampling frequencies through further normalization.

In some cases, the profiling data aggregation component 424 normalizes the number of activities to the number of cores on each instance in case more active states are collected that sum up to more than the total available CPU time. The profiling data aggregation component 424 also surfaces idle CPU times at an instance level if the number of active states sum up to less than the available CPU resources. After the profiling data aggregation component 424 normalizes, aligns and merges the profiling data from each of the layers, the profiling data aggregation component 424 generates the global profiling data and provides the global profiling data to both the programmatic and the graphical user interface 420 for generating visual output 501 (FIG. 5).

Figure 5:
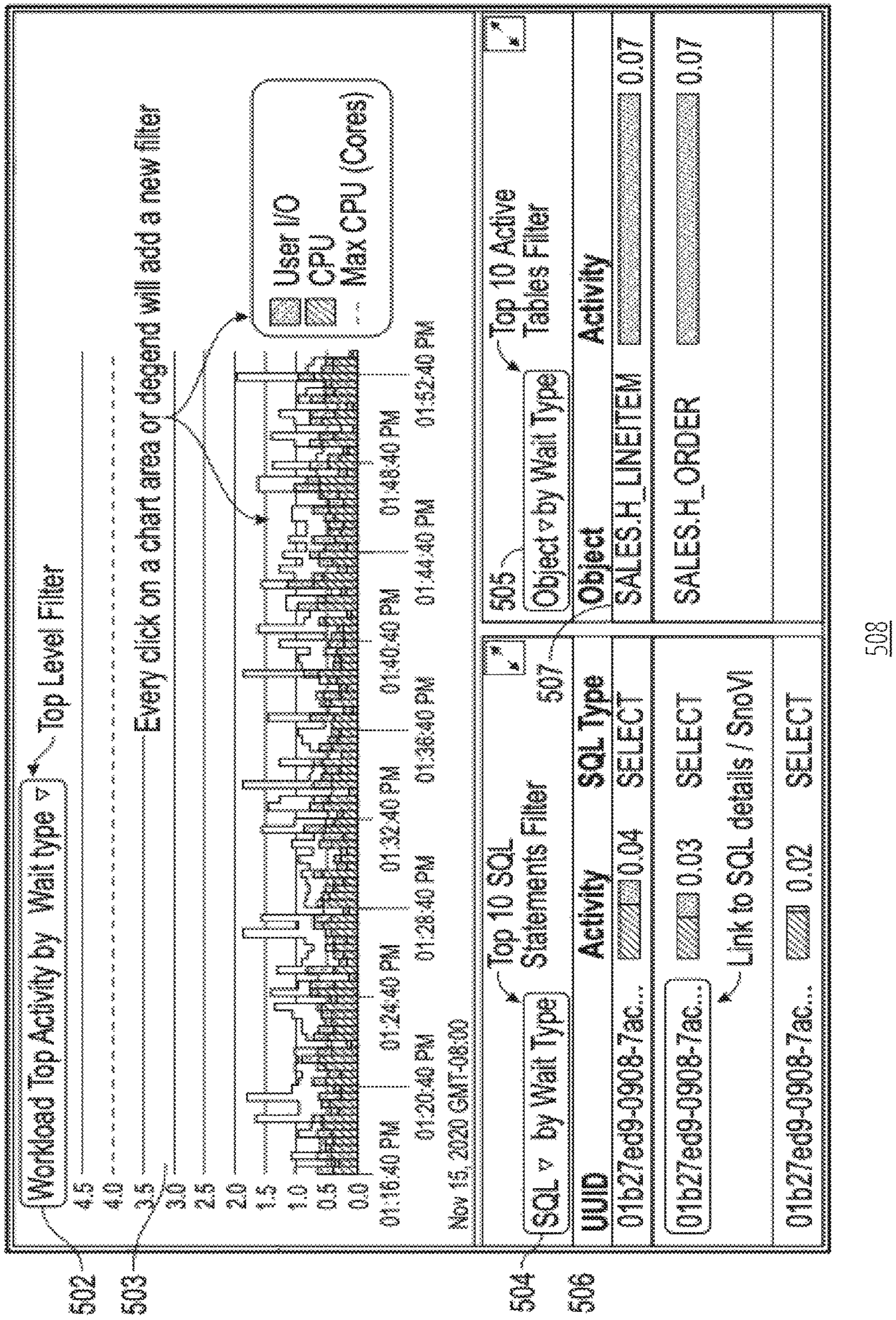
FIG. 5 illustrates an example visual output of the global database profiling system, according to some examples.

FIG. 5 illustrates an example visual output 501 of the global database profiling system 404, according to some examples. The visual output 501 (e.g., via the graphical user interface 420) includes a tool that enables both proactive and reactive performance analysis, allowing users 408 to monitor system and workload activity over time, identify the busiest system components, and conduct root cause analysis of performance issues. The graphical user interface 420 provides visibility into user-initiated (e.g., logical activities) and system background activities (e.g., physical activities), offering a holistic view of system performance. Users 408 can perform real-time and historical analysis, with a custom time picker for examining performance over various time ranges. The tooling supports multidimensional analysis across multiple levels and dimensions, including system database layers 406, instances, resource consumption types, wait types, workload types, SQL properties, and object properties.

In some cases, the graphical user interface 420 features drill-down capabilities, enabling users to zoom in from high-level components to low-level dimensions for detailed investigation. The graphical user interface 420, using the information provided by the profiling data aggregation component 424, can identify top N activities within specified time periods, such as most active clusters, queries, or database objects. The graphical user interface 420 integrates with other tools for processing profiler data and supports performance comparisons between different time periods.

Key use cases for the graphical user interface 420 include checking past activities, which allows users to examine the activity of specific dimensions such as databases, users, or SQL queries over a given time period. The graphical user interface 420 enables analysis of activity trends over time, providing insights into specific dimensions like SQL queries or wait events. The graphical user interface 420 supports identification of top N activities, focusing on the most common or impactful activities within a given time range, such as top wait events, top SQL executions, or top objects accessed. Users 408 can gain workload insights, including analysis of execution phases, SQL command types, expensive plan operators, object types accessed, and client/application performance. The graphical user interface 420 helps in analyzing locking and contention issues, allowing users to find blocked transactions, determine waiting times, and identify blocking transactions. The graphical user interface 420 supports workload activity comparison across different periods, systems, or similar system components to identify performance differences and potential issues. In some cases, the graphical user interface 420 enables blast radius analysis, helping users 408 identify the list of accounts that accounted for the highest percentages of activity within a selected period where a problem occurred, thus understanding the scope and impact of performance issues.

For performance investigation, the graphical user interface 420 supports root cause analysis of performance regressions and determination of blast radius. The graphical user interface 420 provides both real-time and historical analysis options, enabling users to examine current performance or investigate past events at specific times. Its time selection feature, with a custom time picker, allows analysis of slow performance over extended periods or investigation of performance spikes within short timeframes. The multidimensional analysis capability supports performance and activity analysis at multiple levels and across various dimensions, enabling deep, granular analysis of system performance. The graphical user interface 420 provides a drill-down feature allowing users 408 to zoom in from high-level components or activity dimensions down to multiple low-level dimensions for detailed investigation of performance issues. The graphical user interface 420 also offers top N activity analysis, identifying the most active objects or dimensions within a specified time period.

As an example, the visual output 501 can include a graph 503. The graph 503 represents a collected set of profiling data across the database layers 406 for a specified period of time. The visual output 501 can be presented by the graphical user interface 420 to a user 408 on a user device 402, such as via the browser 410. In some cases, the graphical user interface 420 can receive input from a user that selects a particular type of workload, such as via the workload filter option 502. In the example shown, the user 408 selects the wait type filter from the workload filter option 502. In response, the graph 503 is updated to only show profiling data that corresponds to the selected workload type. Namely, the graph 503 only shows activities corresponding to a particular wait.

The graphical user interface 420 can receive input that selects a particular region of the graph 503 to view specific details about that particular time region or activity. Additional filters can be provided and used to present information about the profiling data. For example, the visual output 501 can present SQL activity information 506 based on selections made via a SQL filter option 504. For example, a user can specify a particular SQL statement or one or more SQL types of activities via the SQL filter option 504. In response, the graphical user interface 420 presents or updates the SQL activity information 506 that is presented and can sort that information based on the amount of the activity performed or executed across the database layers 406 during the specified time period shown in the graph 503.

Similarly, the visual output 501 can present object activity information 507 based on selections made via an object filter option 505. For example, a user can specify a particular object via the object filter option 505. In response, the graphical user interface 420 presents or updates the object activity information 507 that is presented and can sort that information based on the amount of the activity performed or executed across the database layers 406 during the specified time period shown in the graph 503.

Figure 6:
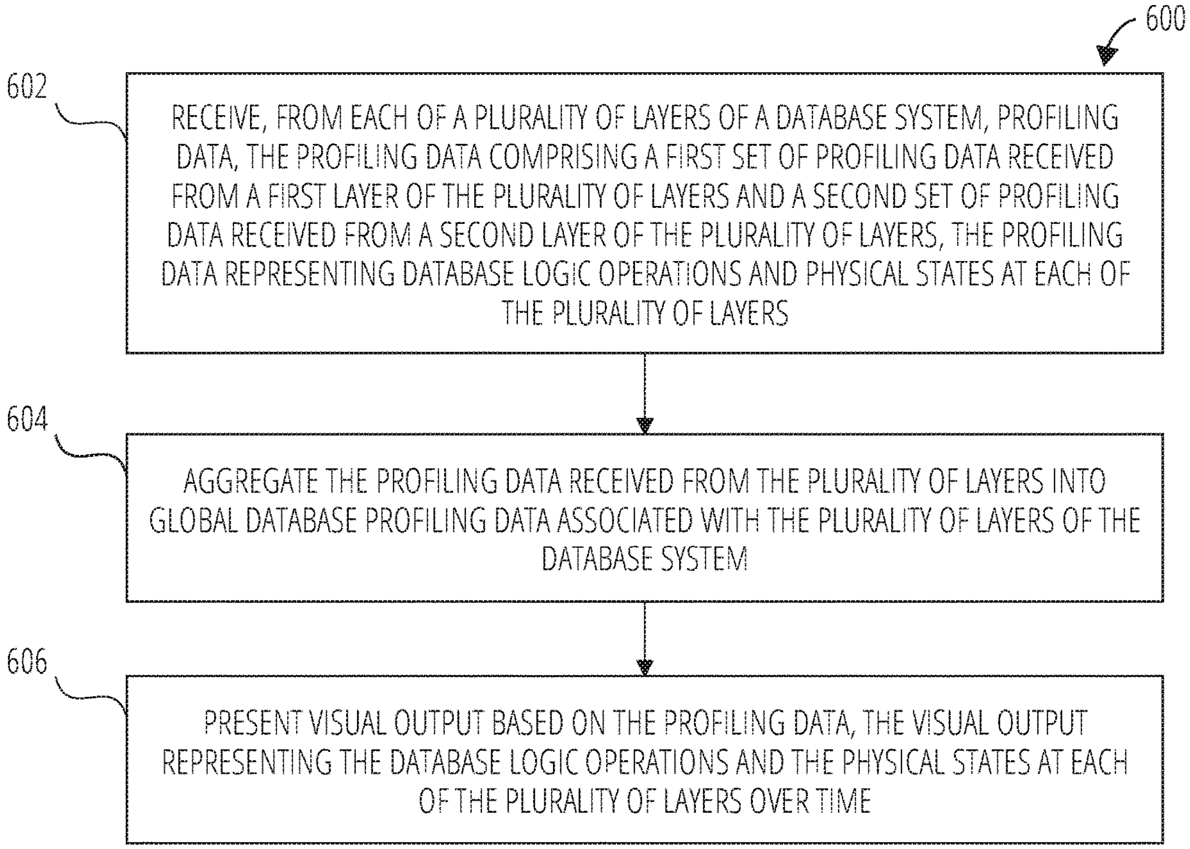
FIG. 6 is a flowchart of an example method (or process) for generating a global database profile, according to some examples.

FIG. 6 is a flowchart of an example method 600 for generating a global profile or global profiling data, according to some examples. Method 600 may be embodied in computer-readable instructions for execution by one or more hardware components (e.g., one or more processors) such that the operations of method 600 can be performed by components of the global database profiling system 404 or the network-based database system 102, such as a network node (e.g., the global database profiling system 404 executing on a network node of the compute service manager 106) or a computing device (e.g., client device 112), one or both of which may be implemented as machine 700 of FIG. 7 performing the disclosed functions. Accordingly, method 600 is described below, by way of example with reference thereto. However, it shall be appreciated that method 600 may be deployed on various other hardware configurations and is not intended to be limited to deployment within the network-based database system 102.

At operation 602, a hardware processor (e.g., implementing the global database profiling system 404) receives, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers, as discussed above.

At operation 604, the hardware processor (e.g., implementing the global database profiling system 404) aggregates the profiling data received from the plurality of layers into global database profiling data associated with the plurality of layers of the database system, as discussed above.

At operation 606, the hardware processor (e.g., implementing the global database profiling system 404) presents visual output based on the profiling data, the visual output representing the database logic operations and the physical states at each of the plurality of layers over time, as discussed above.

Figure 7:
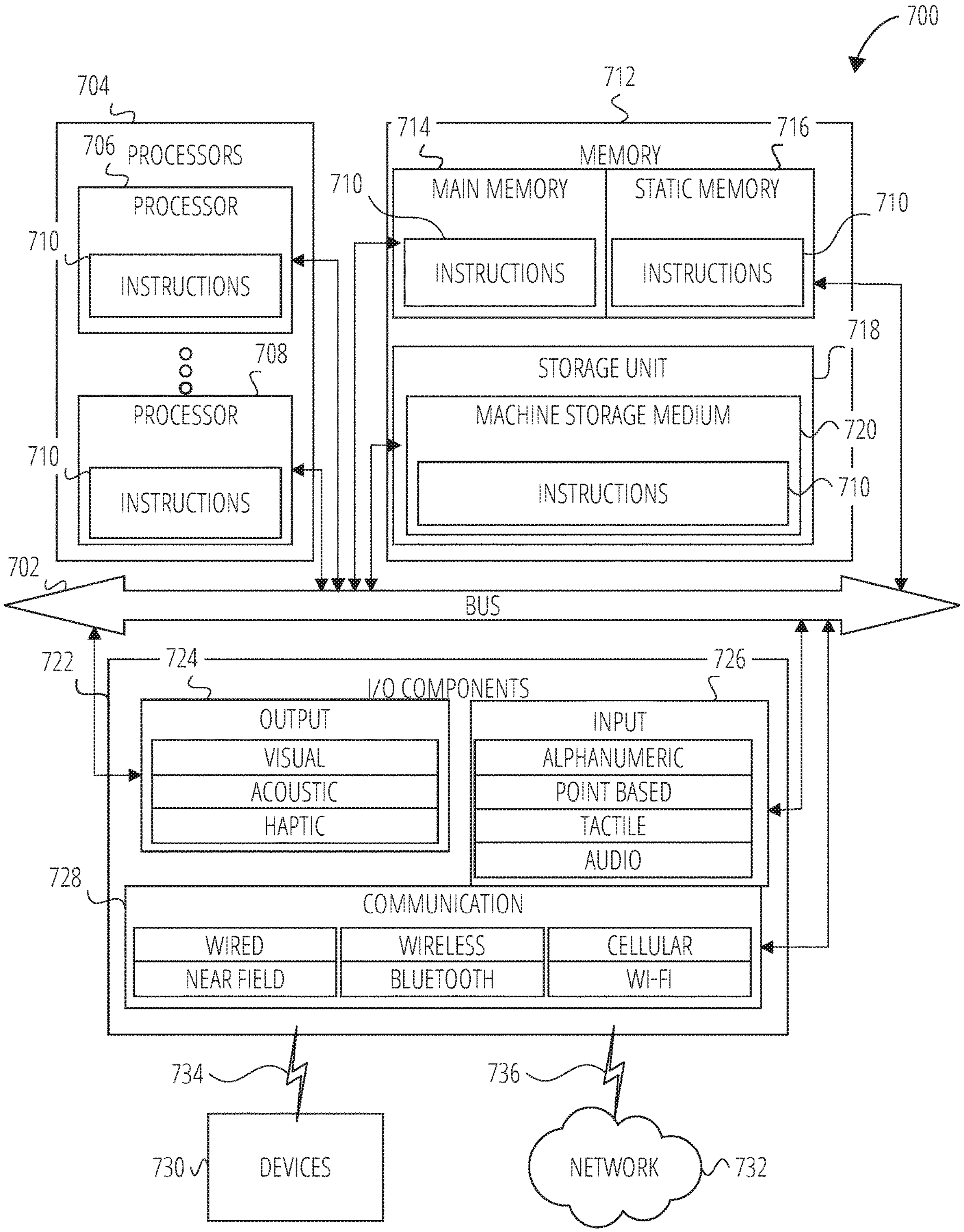
FIG. 7 illustrates a diagrammatic representation of a machine in the form of a computer system within which a set of instructions may be executed for causing the machine to perform any one or more of the methodologies discussed herein, in accordance with some examples.

FIG. 7 illustrates a diagrammatic representation of a machine 700 in the form of a computer system within which a set of instructions can be executed for causing the machine 700 to perform any one or more of the methodologies discussed herein, according to some examples of the present disclosure. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein can be executed. For example, the instructions 710 may cause the machine 700 to execute any one or more operations of any one or more of the methods described herein. As another example, the instructions 710 may cause the machine 700 to implement portions of the data flows described herein. In this way, the instructions 710 transform a general, non-programmed machine into a particular machine 700 (e.g., the compute service manager 106, the execution platform 108, client device 112) that is specially configured to carry out any one of the described and illustrated functions in the manner described herein.

In alternative examples, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines machine 700 that individually or jointly execute the instructions 710 to perform any one or more of the methodologies discussed herein.

The machine 700 includes processors 704, memory 712, and input/output (I/O) components 722 configured to communicate with each other such as via a bus 702. In an example, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 706 and a processor 708 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 712 may include a main memory 714, a static memory 716, and a storage unit 718, all accessible to the processors 704 such as via the bus 702. The main memory 714, the static memory 716, and the storage unit 718 comprising a machine storage medium 720 may store the instructions 710 embodying any one or more of the methodologies or functions described herein. The instructions 710 may also reside, completely or partially, within the main memory 714, within the static memory 716, within the storage unit 718, within at least one of the processors 704 (e.g., within the processor's cache memory), or any suitable combination thereof, during execution thereof by the machine 700.

The I/O components 722 include components to receive input, provide output, produce output, transmit information, exchange information, capture measurements, and so on. The specific I/O components 722 that are included in a particular machine 700 will depend on the type of machine. For example, portable machines such as mobile phones will likely include a touch input device or other such input mechanisms, while a headless server machine will likely not include such a touch input device. It will be appreciated that the I/O components 722 may include many other components that are not shown in FIG. 7. The I/O components 722 are grouped according to functionality merely for simplifying the following discussion and the grouping is in no way limiting. In various examples, the I/O components 722 may include output components 724 and input components 726. The output components 724 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 722 may include communication components 728 operable to couple the machine 700 to a network 732 via a coupling 736 or to devices 730 via a coupling 734. For example, the communication components 728 may include a network interface component or another suitable device to interface with the network 732. In further examples, the communication components 728 may include wired communication components, wireless communication components, cellular communication components, and other communication components to provide communication via other modalities. The devices 730 can be another machine or any of a wide variety of peripheral devices (e.g., a peripheral device coupled via a universal serial bus (USB)). For example, as noted above, the machine 700 may correspond to any client device, the compute service manager 106, the execution platform 108, and the devices 730 may include any other of these systems and devices.

The various memories (e.g., 712, 714, 716, and/or memory of the processor(s) 704 and/or the storage unit 718) may store one or more sets of instructions 710 and data structures (e.g., software) embodying or utilized by any one or more of the methodologies or functions described herein. These instructions 710, when executed by the processor(s) 704, cause various operations to implement the disclosed examples.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 732 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 732 or a portion of the network 732 may include a wireless or cellular network, and the coupling 736 can be a Code Division Multiple Access (CDMA) connection, a Global System for Mobile communications (GSM) connection, or another type of cellular or wireless coupling. In this example, the coupling 736 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 710 can be transmitted or received over the network 732 using a transmission medium via a network interface device (e.g., a network interface component included in the communication components 728) and utilizing any one of a number of well-known transfer protocols (e.g., hypertext transfer protocol (HTTP)). Similarly, the instructions 710 can be transmitted or received using a transmission medium via the coupling 734 (e.g., a peer-to-peer coupling) to the devices 730. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 710 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some examples, the processor or processors may be located in a single location (e.g., within a home environment, an office environment, or a server farm), while in other examples the processors may be distributed across several locations.

Described implementations of the subject matter can include one or more features, alone or in combination as illustrated below by way of examples.

Example 1. A system comprising: at least one hardware processor; and at least one memory storing instructions that cause the at least one hardware processor to perform operations comprising: receiving, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers; aggregating the profiling data received from the plurality of layers into global database profiling data associated with the plurality of layers of the database system; and presenting visual output based on the profiling data, the visual output representing the database logic operations and the physical states at each of the plurality of layers over time.

Example 2. The system of Example 1, wherein the database logic operations represent activities performed on behalf of the database system including one or more application states of the database system, and wherein the physical states represent activities performed by an operating system of a respective layer of the plurality of layers including system level activities represented as call-stacks.

Example 3. The system of any one of Examples 1-2, wherein the activities performed on behalf of the database system comprise foreground compilation and execution of queries and background maintenance tasks comprising cleanup operations of queries.

Example 4. The system of any one of Examples 1-3, wherein the activities performed by the operating system of a respective layer comprise one or more of processor utilization, memory utilization, and hardware resource utilization.

Example 5. The system of any one of Examples 1-4, wherein the plurality of layers comprises a compute service manager layer, a metadata databases layer, and an execution platform layer.

Example 6. The system of any one of Examples 1-5, wherein the operations comprise: causing the compute service manager layer to generate the first set of profiling data periodically, the first set of profiling data comprising individual sets of database logic operations and physical states of database threads executed by the compute service manager layer; causing the metadata databases layer to generate the second set of profiling data periodically, the second set of profiling data comprising individual sets of database logic operations and physical states of the database threads executed by the metadata databases layer; and causing the execution platform layer to generate a third set of profiling data periodically, the third set of profiling data comprising individual sets of database logic operations and physical states of the database threads executed by the execution platform layer.

Example 7. The system of any one of Examples 1-6, wherein the first set of profiling data comprises a first profiler corresponding to the individual sets of the database logic operations of database threads executed by the compute service manager layer and a second profiler corresponding to the individual sets of the physical states of the database threads executed by the compute service manager layer.

Example 8. The system of any one of Examples 1-7, wherein the second set of profiling data comprises a third profiler corresponding to the individual sets of the database logic operations of the database threads executed by the metadata databases layer and a fourth profiler corresponding to the individual sets of the physical states of the database threads executed by the metadata databases layer.

Example 9. The system of any one of Examples 1-8, wherein the third set of profiling data comprises a fifth profiler corresponding to the individual sets of the database logic operations of the database threads executed by the execution platform layer and a sixth profiler corresponding to the individual sets of the physical states of the database threads executed by the execution platform layer.

Example 10. The system of any one of Examples 1-9, wherein the operations comprise: aligning the first set of profiling data, the second set of profiling data, and the third set of profiling data.

Example 11. The system of any one of Examples 1-10, wherein the first set of profiling data, the second set of profiling data, and the third set of profiling data are aligned by matching timestamps with thread identifiers across the first set of profiling data, the second set of profiling data, and the third set of profiling data, wherein the operations comprise removing duplicates across the first set of profiling data, the second set of profiling data, and the third set of profiling data.

Example 12. The system of any one of Examples 1-11, wherein the operations comprise: generating the first set of profiling data, the second set of profiling data, and the third set of profiling data according to a unified global profiling schema.

Example 13. The system of any one of Examples 1-12, wherein the unified global profiling schema comprises a plurality of dimensions comprising: a query lineage level, an object lineage level, one or more query properties, layer specific observability levels, one or more timestamps, one or more activity states, one or more wait states, and one or more additional flags or payloads.

Example 14. The system of any one of Examples 1-13, wherein the one or more activity states represent when a thread is doing active work on a processor, and wherein the one or more wait states represent whether one or more threads are waiting for more work to be assigned or waiting for work associated with the one or more threads to be completed.

Example 15. The system of any one of Examples 1-14, wherein the query lineage level comprises an account, warehouse, user, or session information, and a query identifier of recurrent queries.

Example 16. The system of any one of Examples 1-15, wherein the object lineage level comprises a database, schema, table, or index information, and wherein the one or more query properties comprise a statement type, operator type, or query state.

Example 17. The system of any one of Examples 1-16, wherein the operations comprise: presenting an interactive graph comprising the visual output; and receiving input that interacts with the interactive graph to view performance and activity at the plurality of layers based on different dimensions, thread identifiers, or timestamps, the interactive graph presenting at least one of layer instance identifiers, resource consumption information, workload type information, server query language (SQL) information, object information, concurrency information, context information, or activity type information.

Example 18. The system of any one of Examples 1-17, wherein the operations comprise: providing programmatic access to the profiling data; and computing one or more metrics based on programmatically accessing the profiling data.

Example 19. A method comprising: receiving, by at least one hardware processor, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers; aggregating the profiling data received from the plurality of layers into global database profiling data associated with the plurality of layers of the database system; and presenting visual output based on the profiling data, the visual output representing the database logic operations and the physical states at each of the plurality of layers over time.

Example 20. A machine-storage medium, the machine-storage medium including instructions that when executed by a machine, cause the machine to perform operations comprising: receiving, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers; aggregating the profiling data received from the plurality of layers into global database profiling data associated with the plurality of layers of the database system; and presenting visual output based on the profiling data, the visual output representing the database logic operations and the physical states at each of the plurality of layers over time.

Methods and machine-storage media including instructions for performing any one of Examples 1-20.

Although the examples of the present disclosure have been described concerning specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term “invention” merely for convenience and without intending to voluntarily limit the scope of this application to any single invention or inventive concept if more than one is disclosed. Thus, although specific examples have been illustrated and described herein, it should be appreciated that any arrangement calculated to achieve the same purpose may be substituted for the specific examples shown. This disclosure is intended to cover any adaptations or variations of various examples. Combinations of the above examples, and other examples not specifically described herein, will be apparent, to those of skill in the art, upon reviewing the above description.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated. In the appended claims, the terms “including” and “in which” are used as the plain-English equivalents of the respective terms “comprising” and “wherein.” Also, in the following claims, the terms “including” and “comprising” are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

receiving, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers;

aggregating the profiling data received from the plurality of layers into global database profiling data associated with the plurality of layers of the database system, the aggregating comprising causing samples of the profiling data received from the plurality of layers to have proper cardinality such that the samples are summable directly across the plurality of layers; and presenting visual output based on the profiling data, the visual output representing the database logic operations and the physical states at each of the plurality of layers over time.

2. The system of claim 1, wherein the database logic operations represent activities performed on behalf of the database system comprising one or more application states of the database system, and wherein the physical states represent activities performed by an operating system of a respective layer of the plurality of layers comprising system level activities represented as call-stacks.

3. The system of claim 1, the operations comprising ensuring the proper cardinality by instructing each of the plurality of layers to generate and collect the samples of the profiling data at a same sampling frequency.

4. The system of claim 1, the operations comprising ensuring the proper cardinality by normalizing samples collected at different sampling frequencies across the plurality of layers.

5. The system of claim 1, wherein the plurality of layers comprises a compute service manager layer, a metadata databases layer, and an execution platform layer.

6. The system of claim 5, wherein the operations comprise:

causing the compute service manager layer to generate the first set of profiling data periodically, the first set of profiling data comprising individual sets of database logic operations and physical states of database threads executed by the compute service manager layer;

causing the metadata databases layer to generate the second set of profiling data periodically, the second set of profiling data comprising individual sets of database logic operations and physical states of the database threads executed by the metadata databases layer; and causing the execution platform layer to generate a third set of profiling data periodically, the third set of profiling data comprising individual sets of database logic operations and physical states of the database threads executed by the execution platform layer.

7. The system of claim 6, wherein the first set of profiling data comprises a first profiler corresponding to the individual sets of the database logic operations of database threads executed by the compute service manager layer and a second profiler corresponding to the individual sets of the physical states of the database threads executed by the compute service manager layer.

8. The system of claim 7, wherein the second set of profiling data comprises a third profiler corresponding to the individual sets of the database logic operations of the database threads executed by the metadata databases layer and a fourth profiler corresponding to the individual sets of the physical states of the database threads executed by the metadata databases layer.

9. The system of claim 8, wherein the third set of profiling data comprises a fifth profiler corresponding to the individual sets of the database logic operations of the database threads executed by the execution platform layer and a sixth profiler corresponding to the individual sets of the physical states of the database threads executed by the execution platform layer.

10. The system of claim 6, wherein the operations comprise:

aligning the first set of profiling data, the second set of profiling data, and the third set of profiling data.

11. The system of claim 10, wherein the first set of profiling data, the second set of profiling data, and the third set of profiling data are aligned by matching timestamps with thread identifiers across the first set of profiling data, the second set of profiling data, and the third set of profiling data, wherein the operations comprise removing duplicates across the first set of profiling data, the second set of profiling data, and the third set of profiling data.

12. The system of claim 6, wherein the operations comprise:

generating the first set of profiling data, the second set of profiling data, and the third set of profiling data according to a unified global profiling schema.

13. The system of claim 12, wherein the unified global profiling schema comprises a plurality of dimensions comprising: a query lineage level, an object lineage level, one or more query properties, layer specific observability levels, one or more timestamps, one or more activity states, one or more wait states, and one or more additional flags or payloads.

14. The system of claim 13, wherein the one or more activity states represent when a thread is doing active work on a processor, and wherein the one or more wait states represent whether one or more threads are waiting for more work to be assigned or waiting for work associated with the one or more threads to be completed.

15. The system of claim 1, wherein the aggregating comprises normalizing a number of active states to a number of processor cores on each instance of the plurality of layers when a number of active states sums to more than a total available processor time for the instance.

16. The system of claim 15, wherein the aggregating further comprises surfacing idle processor time at an instance level when the number of active states sums to less than available processor resources for the instance.

17. The system of claim 1, wherein the operations comprise:

presenting an interactive graph comprising the visual output; and receiving input that interacts with the interactive graph to view performance and activity at the plurality of layers based on different dimensions, thread identifiers, or timestamps, the interactive graph presenting at least one of layer instance identifiers, resource consumption information, workload type information, server query language (SQL) information, object information, concurrency information, context information, or activity type information.

18. The system of claim 1, wherein the aggregating comprises distinguishing between wait states representing idle threads waiting for work to be assigned and wait states representing threads waiting for work to be completed on behalf of the threads by other threads, components, or layers, and wherein idle wait states are excluded from summation across the plurality of layers while wait states representing active work elsewhere in the database system are included to enable cross-layer analysis.

19. A method comprising:

receiving, by at least one hardware processor, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers;

aggregating the profiling data received from the plurality of layers into global database profiling data associated with the plurality of layers of the database system, the aggregating comprising causing samples of the profiling data received from the plurality of layers to have proper cardinality such that the samples are summable directly across the plurality of layers; and presenting visual output based on the profiling data, the visual output representing the database logic operations and the physical states at each of the plurality of layers over time.

20. The method of claim 19, wherein the database logic operations represent activities performed on behalf of the database system comprising one or more application states of the database system, and wherein the physical states represent activities performed by an operating system of a respective layer of the plurality of layers comprising system level activities represented as call-stacks.

21. The method of claim 19, wherein the first set of profiling data and the second set of profiling data are aligned by matching timestamps with thread identifiers across the first set of profiling data and the second set of profiling data and removing duplicates across the first set of profiling data and the second set of profiling data.

22. The method of claim 19, comprising:

generating the first set of profiling data and the second set of profiling data according to a unified global profiling schema.

23. The method of claim 19, wherein the plurality of layers comprises a compute service manager layer, a metadata databases layer, and an execution platform layer.

24. The method of claim 23, comprising:

causing the compute service manager layer to generate the first set of profiling data periodically, the first set of profiling data comprising individual sets of database logic operations and physical states of database threads executed by the compute service manager layer;

causing the metadata databases layer to generate the second set of profiling data periodically, the second set of profiling data comprising individual sets of database logic operations and physical states of the database threads executed by the metadata databases layer; and causing the execution platform layer to generate a third set of profiling data periodically, the third set of profiling data comprising individual sets of database logic operations and physical states of the database threads executed by the execution platform layer.

25. The method of claim 24, wherein the first set of profiling data comprises a first profiler corresponding to the individual sets of the database logic operations of database threads executed by the compute service manager layer and a second profiler corresponding to the individual sets of the physical states of the database threads executed by the compute service manager layer.

26. A machine-storage medium, the machine-storage medium comprising instructions that when executed by a machine, cause the machine to perform operations comprising:

receiving, from each of a plurality of layers of a database system, profiling data, the profiling data comprising a first set of profiling data received from a first layer of the plurality of layers and a second set of profiling data received from a second layer of the plurality of layers, the profiling data representing database logic operations and physical states at each of the plurality of layers;

aggregating the profiling data received from the plurality of layers into global database profiling data associated with the plurality of layers of the database system, the aggregating comprising causing samples of the profiling data received from the plurality of layers to have proper cardinality such that the samples are summable directly across the plurality of layers; and presenting visual output based on the profiling data, the visual output representing the database logic operations and the physical states at each of the plurality of layers over time.

27. The machine-storage medium of claim 26, wherein the plurality of layers comprises a compute service manager layer, a metadata databases layer, and an execution platform layer.

28. The machine-storage medium of claim 27, wherein the operations comprise:

causing the compute service manager layer to generate the first set of profiling data periodically, the first set of profiling data comprising individual sets of database logic operations and physical states of database threads executed by the compute service manager layer;

causing the metadata databases layer to generate the second set of profiling data periodically, the second set of profiling data comprising individual sets of database logic operations and physical states of the database threads executed by the metadata databases layer; and causing the execution platform layer to generate a third set of profiling data periodically, the third set of profiling data comprising individual sets of database logic operations and physical states of the database threads executed by the execution platform layer.

29. The machine-storage medium of claim 28, wherein the first set of profiling data comprises a first profiler corresponding to the individual sets of the database logic operations of database threads executed by the compute service manager layer and a second profiler corresponding to the individual sets of the physical states of the database threads executed by the compute service manager layer.

30. The machine-storage medium of claim 26, wherein the database logic operations represent activities performed on behalf of the database system comprising one or more application states of the database system, and wherein the physical states represent activities performed by an operating system of a respective layer of the plurality of layers comprising system level activities represented as call-stacks.

31. The machine-storage medium of claim 26, wherein the operations comprise:

presenting an interactive graph comprising the visual output; and receiving input that interacts with the interactive graph to view performance and activity at the plurality of layers based on different dimensions, thread identifiers, or timestamps, the interactive graph presenting at least one of layer instance identifiers, resource consumption information, workload type information, server query language (SQL) information, object information, concurrency information, context information, or activity type information.

* * * * *